United States Patent
Gupta et al.

(10) Patent No.: US 12,026,511 B2
(45) Date of Patent: Jul. 2, 2024

(54) OPPORTUNISTIC WRITE-BACK DISCARD OF SINGLE-USE VECTOR REGISTER VALUES

(71) Applicant: Samsung Electronics Co., Ltd., Suwon-si (KR)

(72) Inventors: Abhay Raj Kumar Gupta, Mountain View, CA (US); Wilson Wai Lun Fung, Milpitas, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 168 days.

(21) Appl. No.: 17/471,156

(22) Filed: Sep. 9, 2021

(65) Prior Publication Data
US 2022/0300284 A1    Sep. 22, 2022

Related U.S. Application Data

(60) Provisional application No. 63/163,732, filed on Mar. 19, 2021.

(51) Int. Cl.
| | | |
|---|---|---|
| *G06F 9/30* | (2018.01) | |
| *G06F 9/38* | (2018.01) | |
| *G06F 16/172* | (2019.01) | |
| *G06T 1/20* | (2006.01) | |

(52) U.S. Cl.
CPC ........ *G06F 9/30036* (2013.01); *G06F 9/3013* (2013.01); *G06F 9/30138* (2013.01); *G06F 9/3826* (2013.01); *G06F 9/3858* (2023.08); *G06F 16/172* (2019.01); *G06T 1/20* (2013.01)

(58) Field of Classification Search
CPC ............. G06F 9/30036; G06F 9/30138; G06F 9/3826; G06F 9/3857
See application file for complete search history.

(56) References Cited

U.S. PATENT DOCUMENTS

| | | | |
|---|---|---|---|
| 6,862,677 B1 * | 3/2005 | Stravers | G06F 9/3873 |
| | | | 712/228 |
| 9,459,869 B2 | 10/2016 | Olson et al. | |
| 9,652,233 B2 | 5/2017 | Potter et al. | |
| 2013/0332704 A1 * | 12/2013 | Guerrero | G06F 9/30138 |
| | | | 712/220 |
| 2015/0058571 A1 * | 2/2015 | Potter | G06F 9/38 |
| | | | 711/125 |
| 2019/0265974 A1 | 8/2019 | Cheng et al. | |
| 2021/0019198 A1 | 1/2021 | Nelson et al. | |
| 2022/0113975 A1 * | 4/2022 | Lucia | G06F 9/3802 |

* cited by examiner

*Primary Examiner* — Jacob Petranek
(74) *Attorney, Agent, or Firm* — Renaissance IP Law Group LLP

(57) ABSTRACT

A method for performing opportunistic write-back discard of single-use vector register values. The method includes executing instructions of a GPU in a default mode, detecting a beginning of a single-use section that includes instructions that produce single-use vector register values, and executing instructions in a single-use mode. The method includes discarding the write-back of a single-use vector register value if the single-use value gets forwarded either via a bypass path or via register file cache. The method includes inserting hint instructions into an executable program code that demarcates single-use sections. A system includes a microprocessor to execute instructions in the default mode. The microprocessor detects a beginning and an ending of a single-use section that includes instructions that produce single-use vector register values.

12 Claims, 11 Drawing Sheets

200

```
205 →  v_mul_f32   v5, v6, v2
210 →  v_mul_f32   v4, v6, v3
215 →  v_add_f32   v5, v0, v5
220 →  v_add_f32   v4, v1, v4
225 →  v_mul_f32   v9, v7, v2
230 →  v_mul_f32   v8, v7, v3
235 →  v_add_f32   v9, v0, v9
240 →  v_add_f32   v8, v1, v8
       v_mul_f32   v10, v8, v2
       v_mul_f32   v11, v8, v3
       v_add_f32   v10, v0, v10
       v_add_f32   v11, v1, v11
```

305 → v_mul_f32  [v9], v13, v13
v_mul_f32  v8, v2, v23
v_mul_f32  v2, v10, v23
310 → v_mul_f32  v13, v6, [v9]
v_mul_f32  v10, v3, v8
v_fma_f32  v13, v2, v3, v13
315 → v_fma_f32  v2, v1, [v9], v10
v_mul_f32  v10, v7, v2
v_mul_f32  v14, v13, v13
v_fma_f32  v10, v8, v6, v10
v_fma_f32  v14, v23, v23, v14
v_add_f32  v2, v2, v8
v_fma_f32  v14, v10, v10, v14
v_add_f32  v6, v6, v7
v_rsq_f32  v14, v14
v_mul_f32  v13, v13, v14
v_mul_f32  v23, v23, v14
320 → v_add_f32  [v9], v13, [v9]

FIG. 3

```
705 →  s_singleuse_producer  0x0001 //Single-use section begin
       v_fma_f32    v0, v1, v0, s14
       v_mul_f32    v5, v6, v6
       v_sub_f32    v2, s14, v0
       v_fma_f32    v1, v8, v8, v5
       v_fma_f32    v0, v2, v2, v1
       s_mov_b32    s0, s1
       v_sub_f32    v6, v6, v7
       v_sqrt_f32   v0, v0
       v_max_f32    v1, 0, v1
       v_sub_f32    v0, s15, v0
       v_mul_f32    v1, v1, s16
       v_max_f32    v0, 0, v0
       v_mul_f32    v1, 1.5, v1
       v_mul_f32    v0, v0, s18
       v_exp_f32    v1, v1
       v_mul_f32    v0, 1.5, v0
       v_exp_f32    v0, v0
       v_sub_f32    v1, 1.0, v1
       v_sub_f32    v0, 1.0, v0
       v_mul_f32    v1, s17, v1
       v_fma_f32    v2, v0, s19, v1
       s_mov_b32    s0, s1
       s_mov_b32    s1, s2
710 →  s_singleuse_producer  0x0000 //Single-use section end; multi-use section begin
       v_mov_b32    v2, 2.0
       v_add_f32    v3, v1, v2
       v_add_f32    v4, v3, v2
       v_add_f32    v5, v3, v4
       v_add_f32    v6, v5, v4
       v_add_f32    v5, v5, v6
       v_add_f32    v4, v5, v6
715 →  s_singleuse_producer  0x0001 //Single-use section begin; multi-use section end
       v_sub_f32    v1, s2, v4
       v_sub_f32    v0, s3, v1
       v_add_f32    v1, s3, v0
       v_add_f32    v0, s2, v4
```

FIG. 7

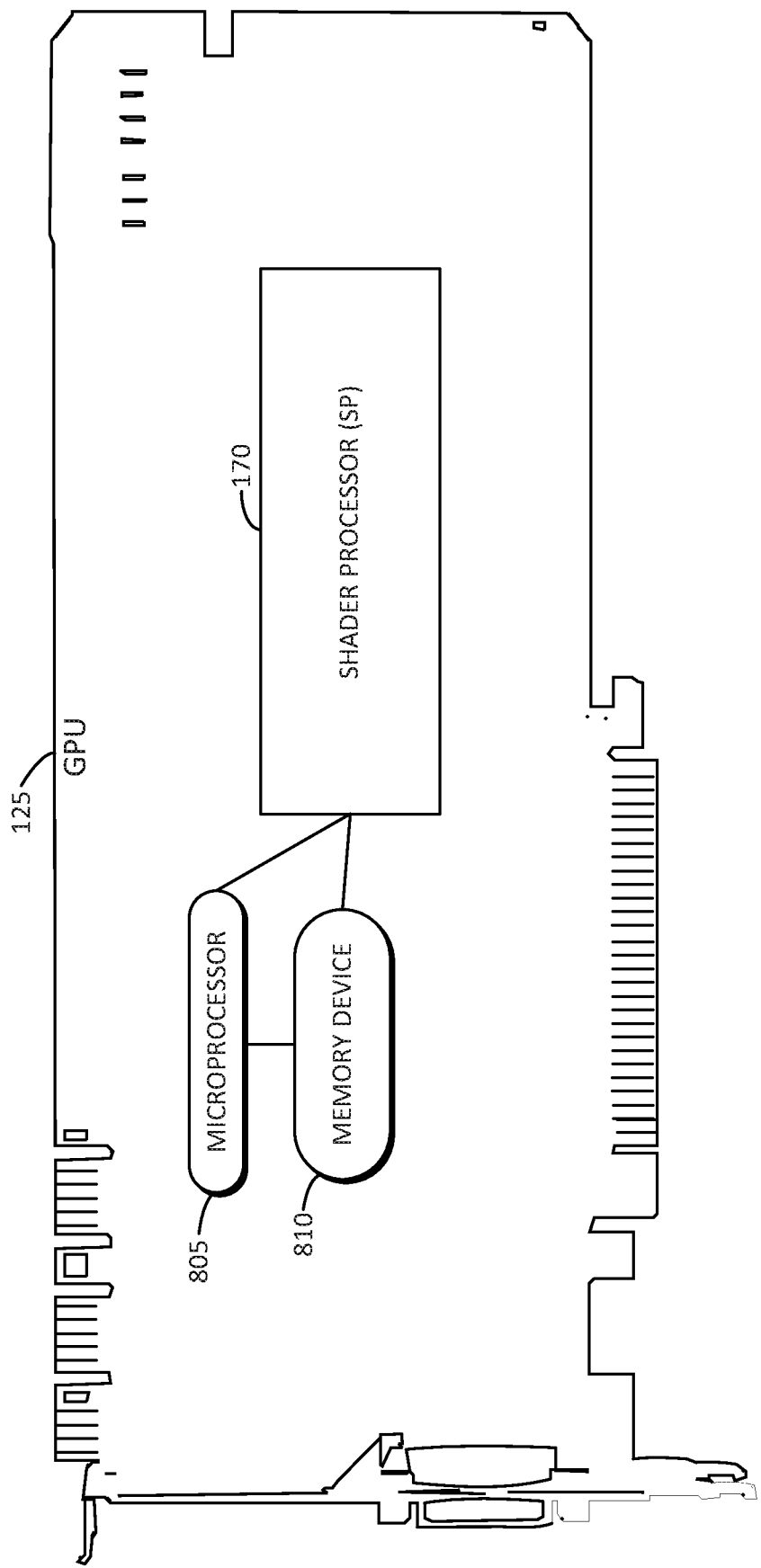

OPPORTUNISTIC WRITE-BACK DISCARD OF SINGLE-USE VECTOR REGISTER VALUES

RELATED APPLICATION DATA

This application claims the benefit of U.S. Provisional Application Ser. No. 63/163,732, filed on Mar. 19, 2021, which is hereby incorporated by reference.

TECHNICAL AREA

The present embodiments relate to computing systems such as graphics processing units (GPUs), and more particularly, to systems and methods for performing opportunistic write-back discard of single-use vector register values.

BACKGROUND

A graphics processing unit (GPU) program may execute instruction sequences where the value produced by one instruction may be consumed by one or more subsequent instructions. A GPU may have a vector register file that may be used for threads that may run concurrently. Reading from and/or writing to the vector register file may consume a significant amount of power. Although a register file cache may alleviate read and write traffic with the vector register file, the register file cache may perform multiple unnecessary write-back operations to the vector register file, which may increase the power consumed by the GPU.

BRIEF SUMMARY

Various embodiments of the disclosure include a method of performing opportunistic write-back discard of single-use vector register values. The method may include executing one or more instructions of a GPU in a default mode. The method may include detecting a beginning of a single-use section that includes one or more instructions that produce single-use vector register values. The method may include executing one or more instructions of the GPU in a single-use mode associated with the single-use section. The method may include skipping write-back of single-use values to the vector register file based on the single-use values being forwarded either via bypass path or via a register file cache.

Some embodiments include a method of preparing an executable program code for performing opportunistic write-back discard of single-use vector register values. The method may include inserting one or more hint instructions into an executable program code of a GPU that demarcate one or more single-use sections. The method may include executing one or more instructions of the GPU in a default mode. The method may include executing the one or more hint instructions. The method may include detecting a beginning of the one or more single-use sections that include one or more instructions that produce single-use vector register values. The method may include executing one or more instructions of the GPU in a single-use mode associated with the one or more single-use sections.

Some embodiments include a system, comprising one or more shader processors configured to execute one or more instructions of a GPU in a default mode. The one or more microprocessors are configured to detect a beginning of a single-use section that includes one or more instructions that produce single-use vector register values. The one or more microprocessors are configured to execute one or more instructions of the GPU in a single-use mode associated with the single-use section. The one or more microprocessors are configured to discard the write-back of a value marked as single-use to the vector register file.

BRIEF DESCRIPTION OF THE DRAWINGS

The foregoing and additional features and advantages of the present disclosure will become more readily apparent from the following detailed description, made with reference to the accompanying figures, in which:

FIG. 2 illustrates single-use vector register values consumed by a single instruction in accordance with some embodiments disclosed herein.

FIG. 3 illustrates multi-use vector register values consumed by multiple instructions in accordance with some embodiments disclosed herein.

FIG. 7 illustrates segments of instructions bounded by single-use hint instruction indicators in accordance with some embodiments disclosed herein.

FIG. 8 illustrates a GPU including a memory device a microprocessor that are configured to avoid write-back to a vector register file in accordance with some embodiments disclosed herein.

DETAILED DESCRIPTION

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first interface could be termed a second interface, and, similarly, a second interface could be termed a first interface, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments disclosed herein reduce an amount of power consumed by a GPU by reducing an amount of reads to a vector register file and/or writes from the vector register file. One or more hint instructions may mark a beginning and/or an end of one or more continuous regions of a program in which instructions produce single-use vector register values. The GPU may discard the write-back of one or more single-use vector register values to the vector register file, because the value may not be used again by other future consumer instructions. Accordingly, the register file cache and/or the vector register file may function more efficiently.

Figure 1:
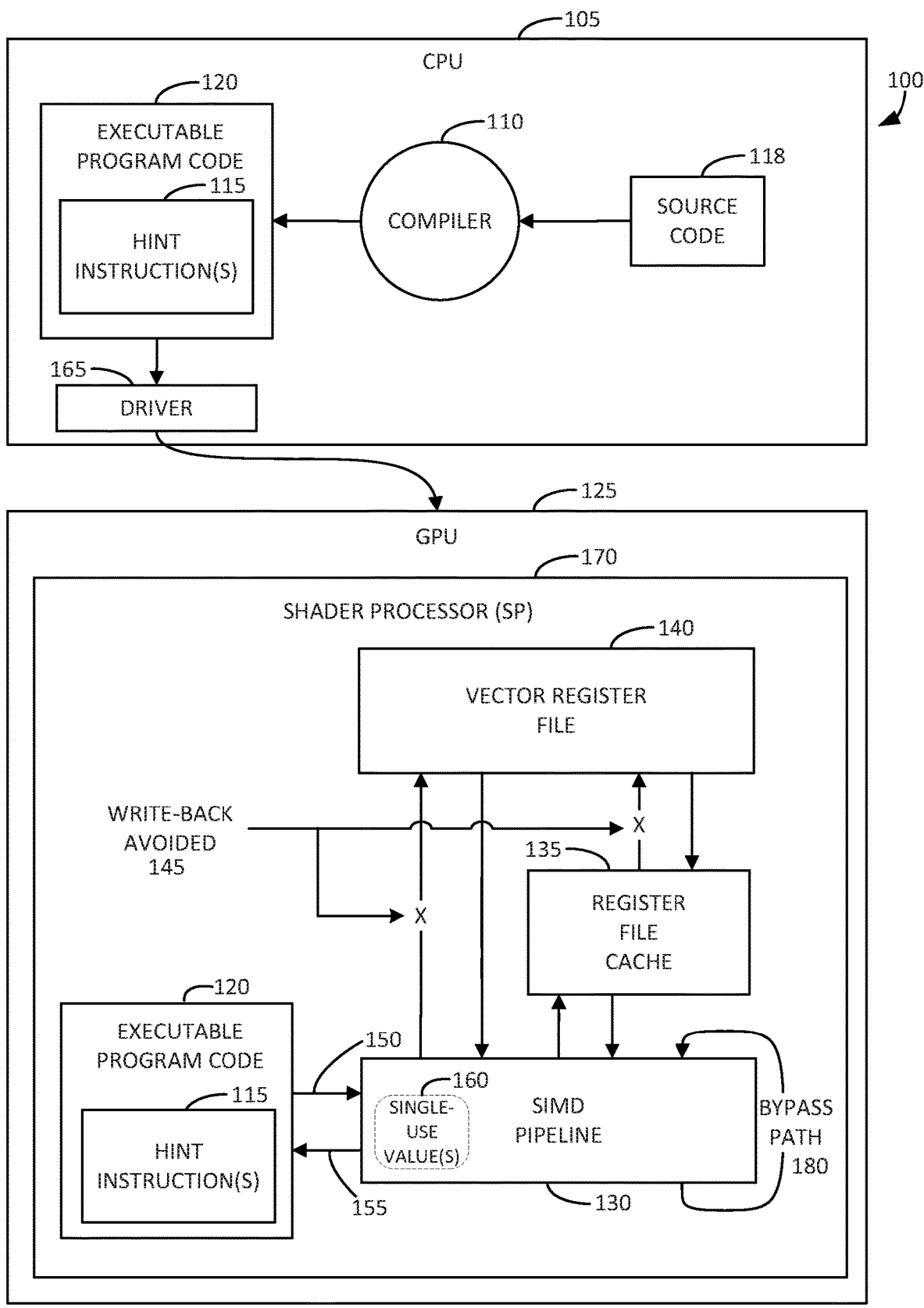
FIG. 1 illustrates a block diagram of a system including a central processing unit (CPU) and a GPU in accordance with some embodiments disclosed herein.

FIG. 1 illustrates a block diagram of a system 100 including a CPU 105 and a GPU 125 in accordance with some embodiments disclosed herein. In accordance with some example embodiments of the disclosure, the GPU 125 may have a vector register file 140 that may be used for threads that may run concurrently. In some embodiments, it may be beneficial to reduce the amount of power consumed by the GPU 125, especially a mobile GPU 125, and/or a GPU 125 of a mobile device. To reduce the amount of reads from and/or writes to the vector register file 140, the GPU 125 may employ one or more register file caches 135 and/or a bypass path 180 for forwarding, for example, at the input and/or output of a single-instruction-multiple-data (SIMD) pipeline 130.

To maintain coherency of the register file cache 135 with the vector register file 140, some embodiments may use a write-through technique in which the output from the SIMD pipeline 130 may be written back to the vector register file 140. In some embodiments with a write-back cache design, the limited capacity of the register file cache 135 may cause dirty data to be evicted back to the vector register file 140.

In some embodiments, the GPU 125 may execute an executable program code 120 that includes instruction sequences in which the value produced by one instruction may be consumed by a subsequent instruction. The GPU 125 may also forward output data 150 from an earlier instruction to a future consumer instruction 155 through the register file cache 135 or directly via the bypass path 180 without going through a vector general purpose register (VGPR) file. In some cases, values from the register file cache 135 may be written back to the vector register file 140 when it is evicted from the register file cache 135. In some embodiments disclosed herein the write-back to the vector register file 140 may be avoided, as further described below.

In some embodiments, a large portion of the instructions of source code 118 and/or the executable program code 120 (e.g., greater than 70 percent) may include one or more instructions that produce single-use vector register values 160 in which the value that is output from a particular instruction may be used by only one future consumer instruction. In other words, the one or more single-use vector register values 160 will not be reused, or may only be used once. This may lead to continuous regions of the source code 118 and/or the executable program code 120 in which every instruction produces one or more single-use vector register values 160.

Information regarding the number of uses of a particular value (i.e., whether single-use or multi-use) may be available to a compiler 110 executed on the CPU 105. One way to detect a single-use producer is to inspect how its destination VGPR is used by the future instruction stream—i.e., the destination VGPR should only be used by a single consumer instruction, before either the VGPR is overwritten or the end of the shader program. While it is possible to build such a forward inspection mechanism into hardware, another approach as disclosed herein is to perform the analysis by the compiler 110. The compiler 110 may mark contiguous regions of instructions as single-use producers. In some embodiments, a hint instruction 115 may pack information regarding multiple contiguous regions of single-use producers, as further described below.

In some embodiments, one or more hint instructions 115 may mark the beginning and/or ending of a region of instructions that include the one or more instructions that produce single-use vector register values 160. The one or more hint instructions 115 may be scalar instructions, which are "cheap" in terms of processing requirements relative to other types of instructions. The one or more hint instructions 115 may be inserted by the compiler 110 or through another software program. The one or more hint instructions 115 may indicate that the instructions that follow may produce the one or more single-use vector register values 160. The one or more hint instructions 115 may be used by hardware of the GPU 125 to discard the one or more single-use vector register values 160 when the one or more single-use vector register values 160 are forwarded (e.g., at 155)—without writing the one or more single-use vector register values 160 back to the vector register file 140. Put differently, the write-back of single-use vector register values 160 can be discarded if they get forwarded either directly via the bypass path 180 or via the register-file cache 135.

For example, a shader processor (SP) 170 may use the one or more hint instructions 115 to discard the write-back of output values of these instructions if the output values have been forwarded to a future consumer instruction. Accordingly, a write-back to the vector register file 140 of the one or more single-use vector register values 160 can be avoided, as shown at 145. This is possible because the one or more single-use vector register values 160 may not be used again by other future consumer instructions of the source code 118 and/or the executable program code 120. Once a single-use vector register value 160 has been forwarded to a consumer instruction, the single-use vector register value 160 will never be re-used; therefore, there is no need to write back the single-use vector register value to the vector register file 140. In addition, an entry occupied by the single-use vector register value 160 may be evicted from the register file cache 135 once the single-use vector register value 160 is read out, thereby improving the hit rate of the register file cache 135. For example, when the one or more single-use vector register values 160 are forwarded to a future consumer instruction (e.g., at 155) via the register file cache 135, the register file cache 135 may mark the entry occupied by the single-use value as single-use. This may allow the register file cache 135 to evict the one or more single-use entries before other entries, for example, because once a single-use entry has been consumed by an instruction, it may not be used again.

Some embodiments may encode single-use information at a producer instruction. The producer instruction may be an instruction that produces the one or more single-use vector register values 160. Such single-use information may be relatively concise, for example, because some instructions may write to a single register but read from multiple source registers, and those source registers may or may not be a last-use. The consumer instruction may be an instruction that consumes the one or more single-use vector register values 160.

In an alternate embodiment, the one or more hint instructions 115 may mark that the instructions that follow may produce one or more multi-use vector register values, so that the unmarked regions can have the one or more instructions that produce single-use vector register values 160, the single-use vector register values 160 would be not written back to the vector register file 140 if the single-use vector register values 1650 are forwarded. It will be understood that the techniques disclosed herein with respect to single-use regions are equally applicable to the alternate embodiment associated with identifying multi-use regions.

In some embodiments, the compiler 110 may identify one or more regions of source code 118 in which the instructions within the one or more regions may produce single-use vector register values using compiler-based static analysis. The compiler 110 may add one or more new hint instructions 115 to the source code 118 and/or to the executable program code 120 to indicate the start and/or end of such a region within the source code 118 and/or to the executable program code 120. After compilation is finished, the executable program code 120 may run on the GPU 125, and hardware, software, or a combination thereof may use the one or more hint instructions 115 to discard one or more writes to the vector register file 140, which may be associated with the one or more single-use vector register values 160, and which may have been forwarded to a consumer instruction (e.g., at 155). A single use-value 160, when forwarded, may be evicted from the register file cache 135, for example, when it is read out (because, for example, it may not be used again). Accordingly, a write-back to the vector register file 140 of the single-use vector register value can be avoided, as shown at 145.

Some embodiments may reduce write traffic to and/or from the vector register file 140, which in turn, may reduce power consumption of the GPU 125. Some embodiments may reduce read traffic from the vector register file 140, for example, by improving a hit rate of the register file cache 135. Some embodiments may implement compact encoding of the one or more hint instructions 115 in the instruction stream, as further described below. Some embodiments may disable one or more features for debugging.

In some embodiments, one or more instructions in one or more regions of the source code 118 and/or the executable program code 120 may be identified by the compiler 110 as producing the one or more single-use vector register values 160. The compiler 110 may insert the one or more hint instructions 115 at the beginning and/or ending of such identified region. The executable program code 120 may be used by a driver 165 to program the GPU 125. The GPU 125 may start running the executable program code 120 in a default mode. In the default mode, the GPU 125 may write data (e.g., all of the data) evicted from the register file cache 135 to the vector register file 140.

Based on the GPU 125 encountering the one or more hint instructions 115 indicating the start of a single-use region of the executable program code 120, the GPU 125 may enter a single-use mode. In the single-use mode, the output values of the following instructions may not be written to the vector register file 140 when their output is forwarded (e.g., at 155). Accordingly, write traffic to the vector register file 140 may be reduced. When the value is forwarded (e.g., at 155), the register file cache 135 may mark the entry occupied by the value as single-use, and may evict the single-use vector register value when the single-use vector register value is read out of the register file cache 135 (e.g., as soon as the single-use vector register value is read out of the register file cache 135). Accordingly, the hit rate of the register file cache 135 may be improved. The GPU 125 may continue execution in the single-use mode, for example, for the duration of a wave (e.g., a collection of threads executing the same program concurrently) until the GPU 125 encounters a hint instruction (e.g., 115) indicating the end of the single-use region, after which the GPU 125 may execute the executable program code 120 in a default (i.e., non-single-use) mode. In other words, in this embodiment, the default mode can be the multi-use mode, and the hint instruction (e.g., 115) can demarcate the single-use mode.

In an alternate embodiment, the one or more hint instructions 115 may mark that the instructions that follow may produce one or more multi-use vector register values, so that the unmarked regions contain instructions that produce the one or more single-use vector register values 160. Accordingly, the GPU 125 may continue execution in a multi-use mode, for example, for the duration of a wave until the GPU 125 encounters a hint instruction (e.g., 115) indicating the end of the multi-use region, after which the GPU 125 may execute the executable program code 120 in a default (i.e., non-multi-use) mode. In other words, in this embodiment, the default mode can be the single-use mode, and the hint instruction (e.g., 115) can demarcate the multi-use mode.

In some embodiments, a hint instruction 115 may pack information regarding up to three contiguous regions of single-use producers, for example, interleaved by up to two non-single-use (i.e., multi-use) producer regions, for example. It will be understood that the hint instruction 115 may pack more than three contiguous regions of single-use producers. It will further be understood that the hint instruction 115 may pack information regarding more than two non-single-use producer regions.

The single-use hint instructions may be propagated down a SIMD pipeline until the VGPR write-back. Control logic may drop VGPR writes (e.g., write kill) based on the hint. The single-use hint instructions may be buffered and applied to subsequent instructions. The SP 170 may transfer the single-use hint instructions for each instruction issued. The SP 170 may maintain the single-use hint of each inflight instruction until VGPR write-back. The SP 170 may keep track of whether the output value of each instruction has been forwarded. The SP 170 may add VGPR write-kill logic that operates based on single-use hint and forward detection. The SP 170 may update the deallocation logic of the register file cache 135 so that once a VGPR write is killed, the corresponding entry in the register file cache 135 may be deallocated.

In some embodiments, the compiler 110 can increase the probability of a single-use destination being forwarded to its consumer instruction before VGPR write by scheduling the producer and consumer as close as possible in the shader program (i.e., executable program code 120). The compiler 110 can eliminate the marking of single-use producer VALU instruction if the distance between the producer and the consumer is too far apart in the program, to the point that data forwarding between them may not occur. The compiler 110 can eliminate the marking of a single-use producer VALU instruction if the producer and the consumer are interrupted by long latency instructions or VALU-vector memory (VMEM) transition. The compiler 110 may also reduce the transition from single-use to non-single-use (i.e., multi-use) producer VALU instructions via instruction scheduling.

FIG. 2 illustrates single-use vector register values 200 consumed by a single instruction in accordance with some embodiments disclosed herein. As shown in FIG. 2, values v5, v4, v9, and v8 are single-use vector register values because they are each consumed by a single subsequent instruction. Specifically, for example, the single-use vector register value v5 shown at line 205 is only consumed by the instruction on line 215. The single-use vector register value v4 shown at line 210 is only consumed by the instruction on line 220. The single-use vector register value v9 shown at line 225 is only consumed by the instruction on line 235. The single-use vector register value v8 shown at line 230 is only consumed by the instruction on line 240.

FIG. 3 illustrates multi-use vector register values 300 consumed by multiple instructions in accordance with some embodiments disclosed herein. As shown in FIG. 3, value v9 is a multi-use value because the value v9 is consumed by multiple subsequent instruction. Specifically, for example, the multi-use value v9 shown at line 305 is consumed by the instructions on lines 310, 315, and 320.

Figure 4:
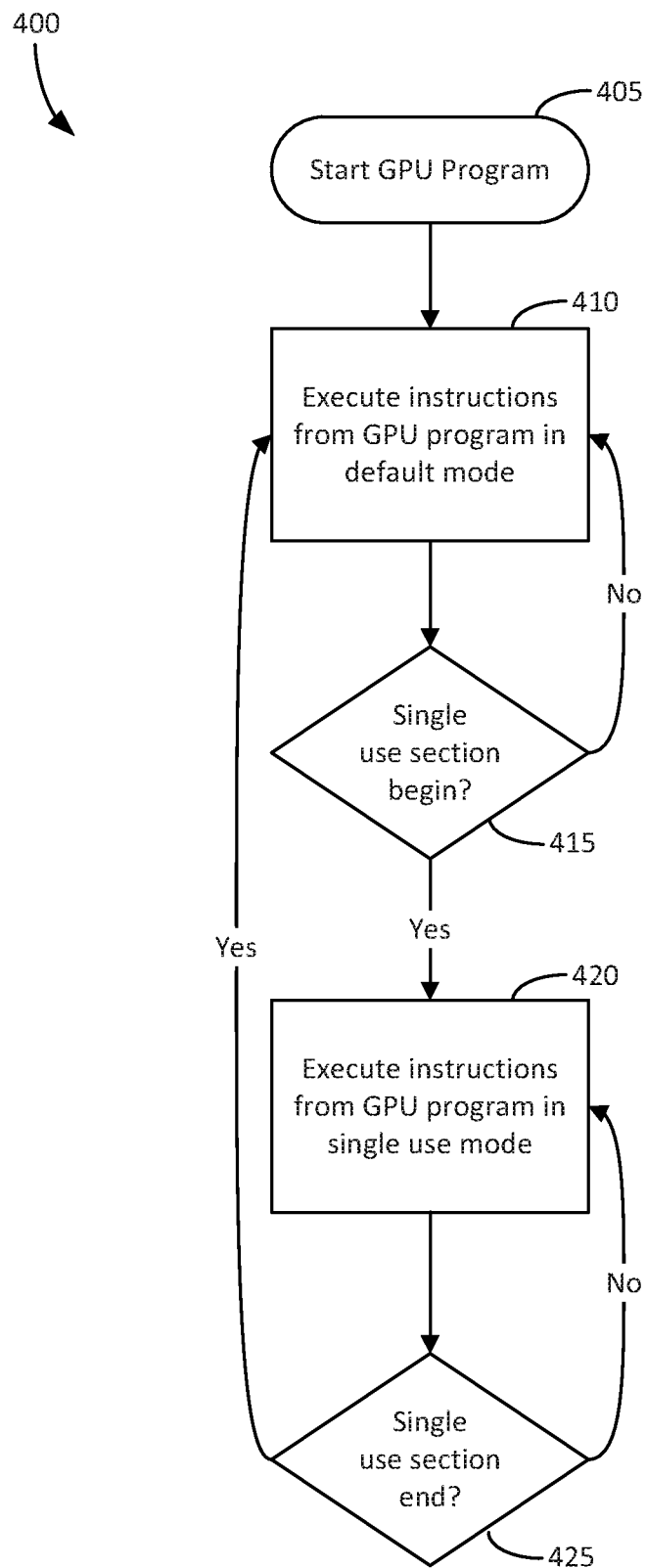
FIG. 4 is a flow diagram illustrating a technique for executing instructions of a GPU program in single-use mode in accordance with some embodiments disclosed herein.

FIG. 4 is a flow diagram 400 illustrating a technique for executing instructions of a GPU program in single-use mode in accordance with some embodiments disclosed herein. Reference is now made to FIGS. 1 and 4.

At 405, a GPU program may be started. For example, the GPU 125 may execute the executable program code 120. At 410, one or more instructions may be executed in a default mode. For example, the GPU 125 may execute one or more instructions associated with the executable program code 120 in the default mode. At 415, the GPU 125 may determine whether a single-use section within the executable program code 120 begins. Based on the GPU 125 determining that the single-use section begins, then the GPU may execute at 420 one or more instructions associated with the executable program code 120 in a single-use mode. Otherwise, based on the GPU 125 determining that the single-use section does not begin, the flow may return to 410 for further processing. At 425, the GPU 125 may determine whether the single-use section ends. Based on determining that the single-use section ends, the flow may return to 410 for further processing. Otherwise, based on determining that the single-use section does not end, the flow may return to 420 for further processing.

Figure 5:
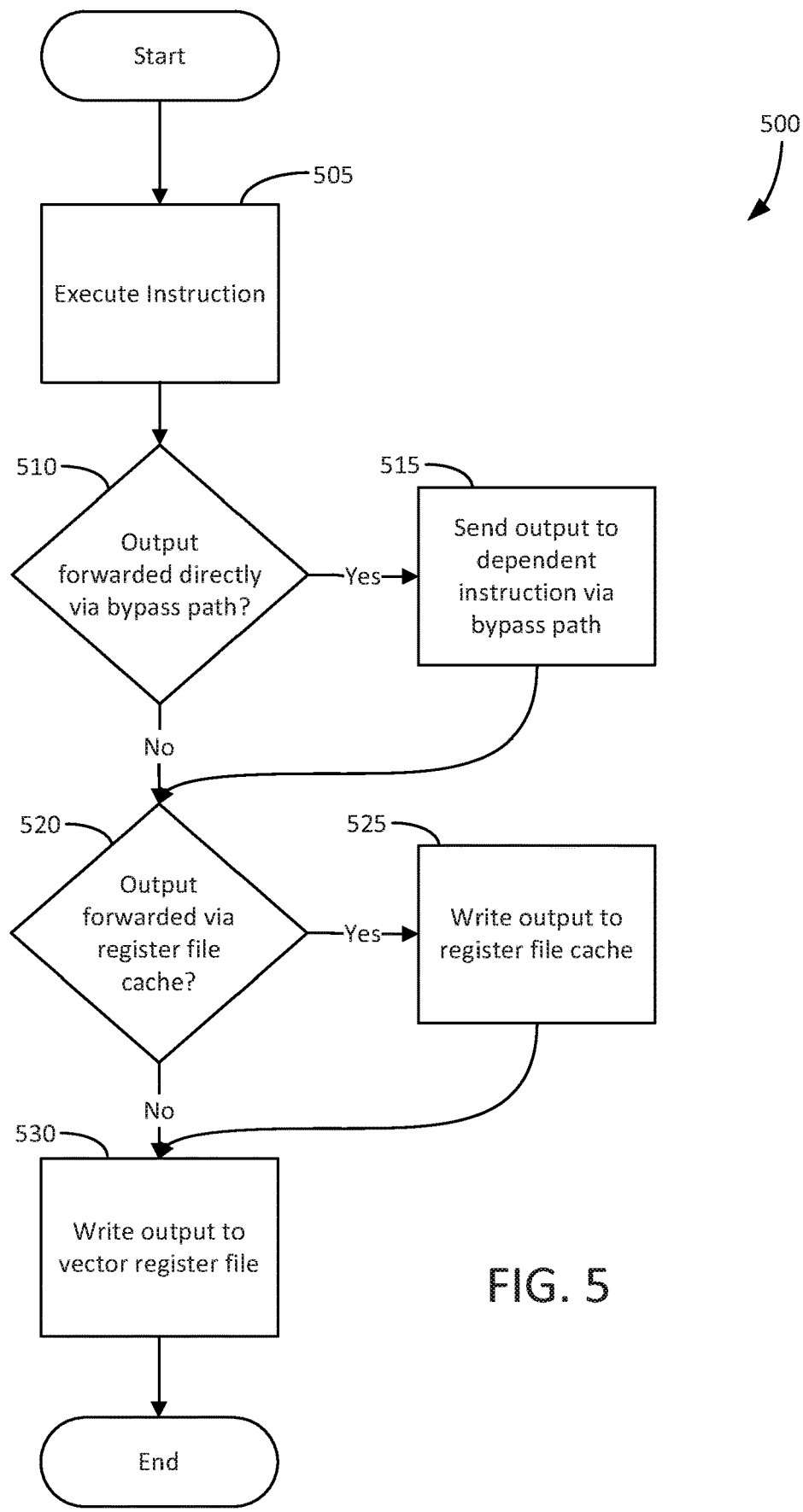
FIG. 5 is a flow diagram illustrating a technique for executing an instruction in the default mode in accordance with some embodiments disclosed herein.

FIG. 5 is a flow diagram 500 illustrating a technique for executing an instruction in the default mode in accordance with some embodiments disclosed herein. Reference is now made to FIGS. 1 and 5.

At 505, one or more instructions may be executed. For example, the GPU 125 may execute one or more instructions associated with the executable program code 120. At 510, the GPU 125 may determine whether the output of the current instruction is forwarded via the bypass path 180. Based on determining that the output can be forwarded via bypass path 180, the GPU 125 may send the output at 515 to a future, dependent instruction via the bypass path 180. Otherwise, based on determining at 510 that the output cannot be forwarded via the bypass path 180, the GPU 125 may determine at 520 whether the output of the current instruction is forwarded via the register file cache 135. Based on determining that the output is forwarded via the register file cache 135, the GPU 125 may write the output value at 525 to the register file cache 135. The GPU 125 may then write at 530 the output value to the vector register file 140.

Figure 6:
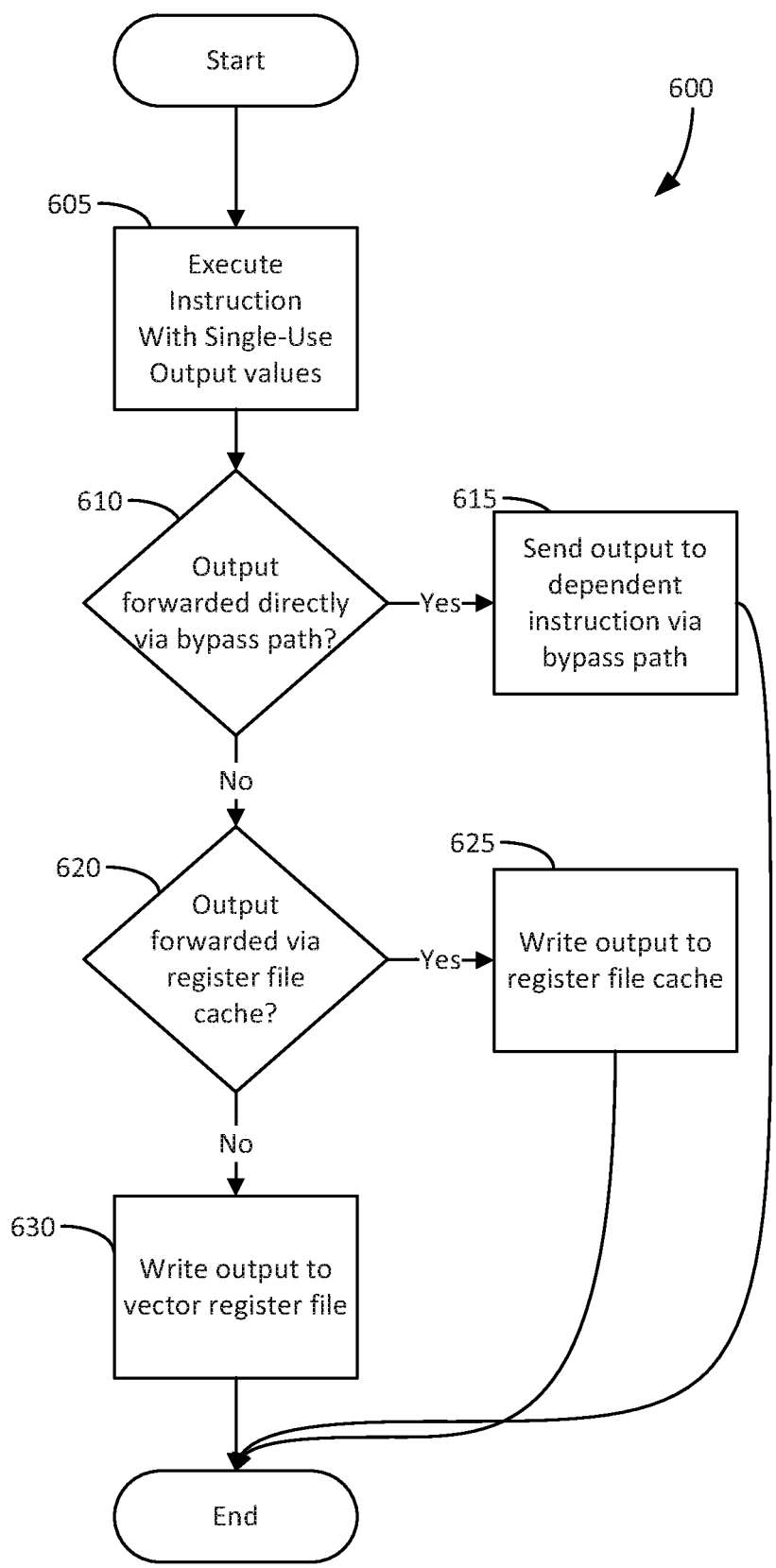
FIG. 6 is a flow diagram illustrating a technique for executing an instruction in the single-use mode in accordance with some embodiments disclosed herein

FIG. 6 is a flow diagram 600 illustrating a technique for executing an instruction in the single-use mode in accordance with some embodiments disclosed herein. Reference is now made to FIGS. 1 and 6.

At 605, one or more instructions may be executed. For example, the GPU 125 may execute one or more instructions associated with the executable program code 120. At 610, the GPU may determine whether the output value of the current instruction is forwarded to a future instruction via the bypass path 180. Based on determining that the output value of the current instruction is forwarded via the bypass path 180, the GPU 125 may send at 615 the output to a future instruction via the bypass path 180. The GPU 125 may then skip the write-back of this output value to the vector register file 140.

At 620, the GPU 125 may determine whether the output value of the current instruction is forwarded via the register file cache 135. Based on determining that the output value of the current instruction is forwarded via the register file cache 135, the GPU 125 may write at 625 the output value to the register file cache 135. Further, the GPU 125 may mark the entry occupied by the output value of the instruction in the register file cache 135 as single-use. The GPU 125 may then skip the write-back of this output value to the vector register file 140. Otherwise, based on determining that the output value of the current instruction cannot be forwarded to a future instruction via the register file cache 135, the GPU 125 may write back at 630 this output value to the vector register file 140. In case the GPU 125 needs to allocate a new entry in the register file cache 135, the GPU 125 may choose to evict one or more entries marked as single-use in the register file cache 135 if present and has been forwarded, before other entries in order to improve the hit rate of the register file cache 135.

FIG. 7 illustrates segments of instructions 700 bounded by single-use hint instruction indicators (e.g., 705, 710, 715) in accordance with some embodiments disclosed herein. As shown in FIG. 7, the single-use hint instructions may demarcate regions that are associated with one or more instructions that produce single-use vector register values. For example, the single-use hint instruction shown on line 705 can indicate a start of a region associated with one or more instructions that produce one or more single-use vector register values. The single-use hint instruction shown on line 710 can indicate an end of the region associated with one or more instructions that produce single-use vector register values. The single-use hint instruction shown on line 715 may indicate the start of another region associated with one or more instructions that produce one or more single-use vector register values. The regions not demarked by the single-use hint instructions can be associated with one or more instructions that produce one or multi-use vector register values.

In some embodiments, a hint instruction can encode a length of a region so that a closing hint instruction is not needed. For example, the hint instruction can indicate that the next 20 instructions comprise a region of instructions that produce single-use vector register values. Alternatively, the hint instruction can indicate that the next 20 instructions comprise a region of instruction that may produce multi-use vector register values. The length can be encoded or otherwise embedded into the hint instruction itself.

In some embodiments, a hint instruction can encode multiple single-use regions. For example, the hint instruction can indicate that two or more following regions comprise regions of instructions that produce single-use vector register values. The hint instruction can include multiple lengths and offsets, for example. Alternatively, the hint instruction can indicate that two or more following regions comprise regions of instructions that produce multi-use vector register values. In some embodiments, the hint instruction may incorporate short bursts of multiple-use instructions within the single-use region.

FIG. 8 illustrates a GPU 125 including a memory device 810 and a microprocessor 805 that are configured to avoid write-back to a vector register file 140 in accordance with some embodiments disclosed herein. The GPU 125 may include one or more microprocessors 805. The one or more microprocessors 805 may be one or more SPs. The one or more microprocessors 805 may execute the executable program code 120. The one or more microprocessors 805 may manage the register file cache 135. The one or more microprocessors 805 may communicate with the SIMD pipeline 130. The one or more microprocessors 805 may manage the register file cache 135 and/or forwarding such that a write-back to the vector register file 140 is avoided as shown at 145, and as described in detail above. The memory device 810 may include or otherwise store the register file cache 135 and vector register file 140. In some embodiments, the register file cache 135 is made out of flip flops, and the vector register file 140 is made out of synchronous random access memory (SRAM) devices. The register file cache 135 and the vector register file 140 may reside inside an SP. In some embodiments, each SP has a separate copy of the register file cache 135 and/or the vector register file 140.

Figure 9:
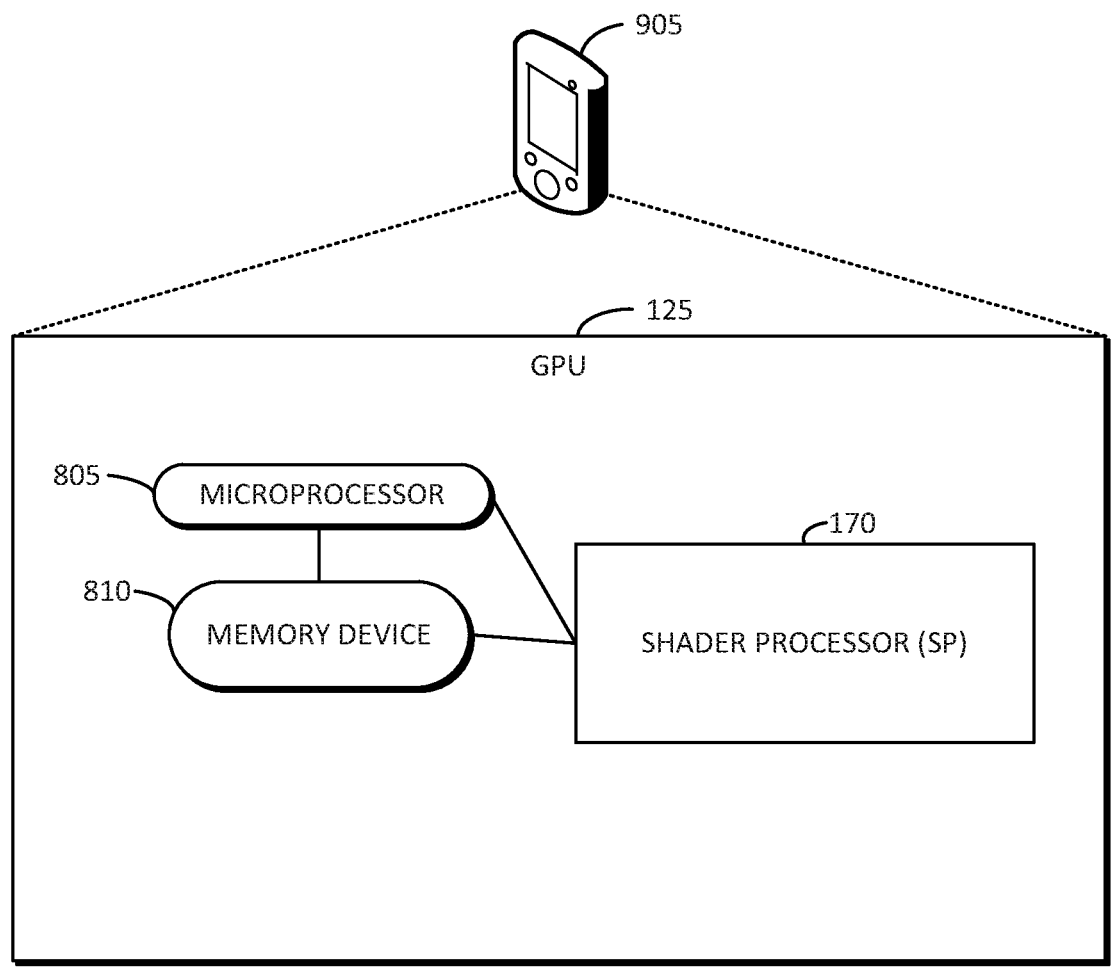
FIG. 9 illustrates a smart phone including a GPU having a memory device and a microprocessor that are configured to avoid write-back to a vector register file in accordance with some embodiments disclosed herein.

FIG. 9 illustrates a smart phone 905 including a GPU 125 having a memory device 810 and a microprocessor 805 that are configured to avoid write-back to a vector register file 140 in accordance with some embodiments disclosed herein. Reference is now made to FIGS. 1 and 9. The memory device 810 may include or otherwise store the register file cache 135 and vector register file 140. The GPU 125 may include one or more microprocessors 805. The one or more microprocessors 805 may be one or more SPs, and/or may be associated with the SP 170. The one or more microprocessors 805 may execute the executable program code 120. The one or more microprocessors 805 may manage the register file cache 135. The one or more microprocessors 805 may communicate with the SIMD pipeline 130. The one or more microprocessors 805 may manage the register file cache 135 and/or forwarding such that a write-back to the vector register file 140 is avoided as shown at 145, and as described in detail above.

Figure 10:
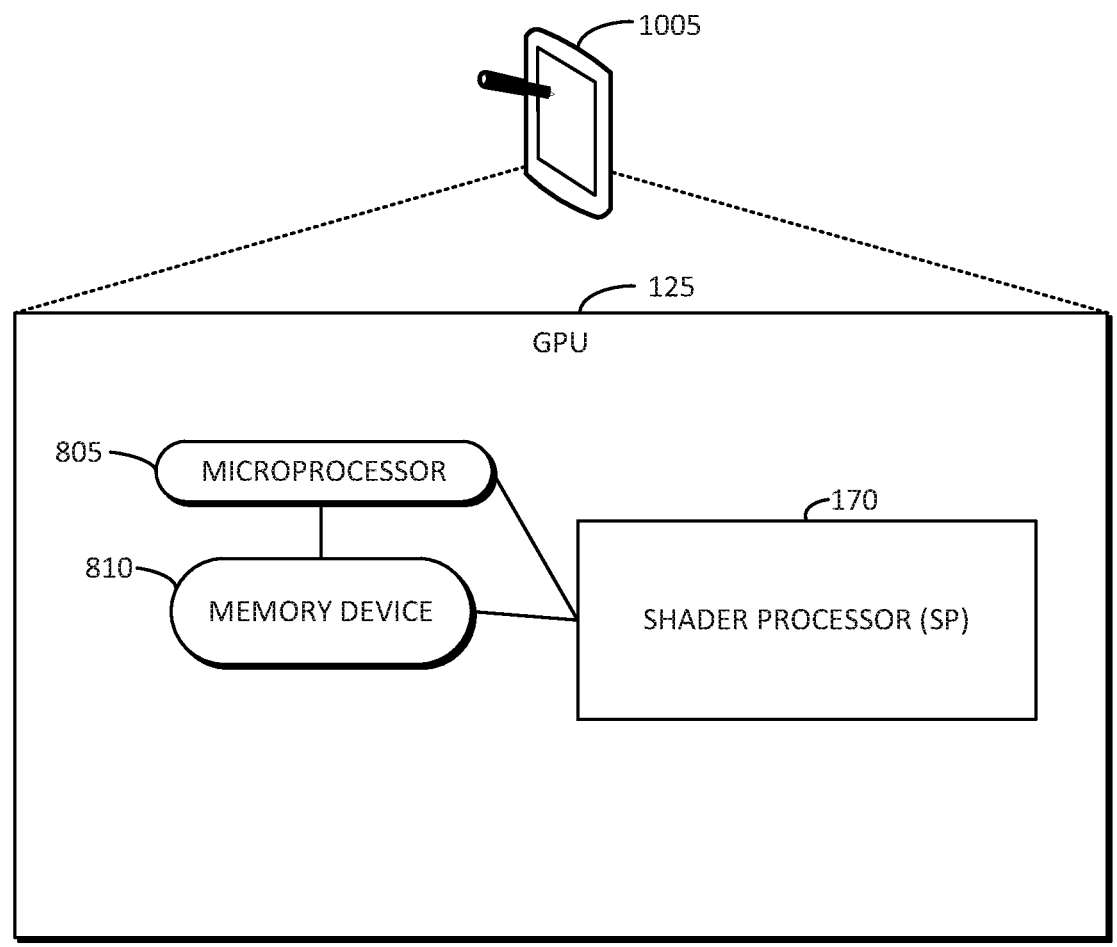
FIG. 10 illustrates a smart tablet including a GPU having a memory device and a microprocessor that are configured to avoid write-back to a vector register file in accordance with some embodiments disclosed herein.

FIG. 10 illustrates a smart tablet 1005 including a GPU 125 having a memory device 810 and a microprocessor 805 that are configured to avoid write-back to a vector register file 140 in accordance with some embodiments disclosed herein. Reference is now made to FIGS. 1 and 10. The memory device 810 may include or otherwise store the register file cache 135 and vector register file 140. The GPU 125 may include one or more microprocessors 805. The one or more microprocessors 805 may be one or more SPs, and/or may be associated with the SP 170. The one or more microprocessors 805 may execute the executable program code 120. The one or more microprocessors 805 may manage the register file cache 135. The one or more microprocessors 805 may communicate with the SIMD pipeline 130. The one or more microprocessors 805 may manage the register file cache 135 and/or forwarding such that a write-back to the vector register file 140 is avoided as shown at 145, and as described in detail above.

Figure 11:
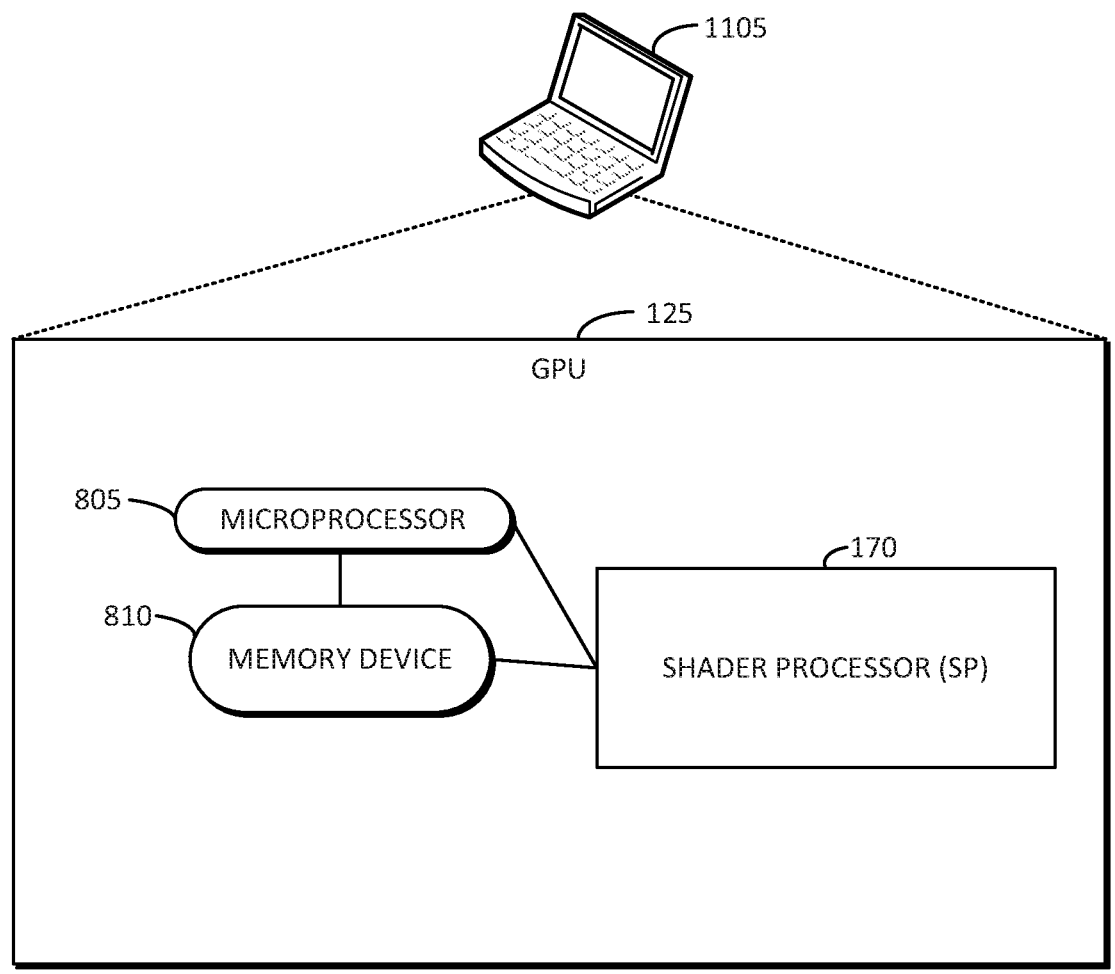
FIG. 11 illustrates a notebook computer including a GPU having a memory device and a microprocessor that are configured to avoid write-back to a vector register file in accordance with some embodiments disclosed herein.

FIG. 11 illustrates a notebook computer 1105 including a GPU 125 having a memory device 810 and a microprocessor 805 that are configured to avoid write-back to a vector register file 135 in accordance with some embodiments disclosed herein. Reference is now made to FIGS. 1 and 11. The memory device 810 may include or otherwise store the register file cache 135 and vector register file 140. The GPU 125 may include one or more microprocessors 805. The one or more microprocessors 805 may be one or more SPs, and/or may be associated with the SP 170. The one or more microprocessors 805 may execute the executable program code 120. The one or more microprocessors 805 may manage the register file cache 135. The one or more microprocessors 805 may communicate with the SIMD pipeline 130. The one or more microprocessors 805 may manage the register file cache 135 and/or forwarding such that a write-back to the vector register file 140 is avoided as shown at 145, and as described in detail above.

The majority of GPU shaders may have greater than 70% instructions that produce single-use vector register values. Using hint instructions as disclosed herein, efficiency can be increased and traffic through the VGPR reduced. Accordingly, the power consumed by the GPU may be significantly reduced. The use of a register file cache can further reduce traffic. Embodiments disclosed herein may reduce a significant amount of register file write traffic, which in turn may reduce a significant amount of power consumption. Moreover, register file read traffic may also be reduced by improving the hit rate of the register file cache. Embodiments disclosed herein also provide compact encoding of single-use hint instructions in the instruction stream.

The various operations of methods described above may be performed by any suitable means capable of performing the operations, such as various hardware and/or software component(s), circuits, and/or module(s).

Some embodiments include a method of performing opportunistic write-back discard of single-use vector register values. The method may include executing one or more instructions of a graphics processing unit (GPU) in a default mode. The method may include detecting a beginning of a single-use section that includes one or more instructions of the GPU that produce one or more single-use vector register values. The method may include executing the one or more instructions of the GPU in a single-use mode associated with the single-use section. The method may include discarding a write-back of the one or more single-use vector register values associated with the one or more instructions of the single-use section to a vector register file based on the one or more single-use vector register values being forwarded via a bypass path. The method may include discarding a write-back of the one or more single-use vector register values associated with the one or more instructions of the single-use section to a vector register file based on the one or more single-use vector register values being forwarded via a register file cache. The method may include determining whether an output value of the one or more instructions is forwarded to a future instruction via a bypass path.

Based on determining that the output value of the one or more instructions is forwarded to the future instruction, the method may include sending the output value of the one or more instructions to the future instruction via the bypass path. The method may include skipping, by the GPU, a write-back of the output value to a vector register file. Based on determining that the output value of the one or more instructions is not forwarded to the future instruction via the bypass path, the method may include determining whether the output value of the one or more instructions is forwarded via a register file cache. The method may include determining whether an output value of the one or more instructions is forwarded to a future instruction via a register file cache. Based on determining that the output value of the one or more instructions is forwarded to the future instruction, the method may include writing the output value to the register file cache. The method may include marking an entry occupied by the output value inside the register file cache as single-use. The method may include skipping write-back of the output value to a vector register file. Based on determining that the output value of the one or more instructions is not forwarded to any future instruction, the method may include writing back the output value to a vector register file. The method may include evicting one or more entries marked as single-use in the register file cache before other entries to improve hit rate of the register file cache.

In some embodiments, the method may include detecting the beginning of the single-use section includes executing a hint instruction. In some embodiments, the method may include encoding multiple single-use sections into the hint instruction. In some embodiments, the method may include detecting an ending of the single-use section. In some embodiments, the method may include detecting the ending of the single-use section includes executing a hint instruction.

Some embodiments include a method of preparing an executable program code for performing opportunistic write-back discard of single-use vector register values. The method may include inserting one or more hint instructions into an executable program code of a graphics processing unit (GPU) that demarcate one or more single-use sections. The method may include executing one or more instructions of the GPU in a default mode. The method may include executing the one or more hint instructions. The method may include detecting a beginning of the one or more single-use sections that include the one or more instructions of the GPU that produce one or more single-use vector register values. The method may include executing the one or more instructions of the GPU in a single-use mode associated with the one or more single-use sections. The method may include detecting an ending of the one or more single-use sections.

Based on detecting the ending of the one or more single-use sections, the method may include reverting to the default mode. The method may include discarding a write-back of the one or more single-use vector register values to a vector register file based on the one or more single-use vector register values being forwarded via a bypass path. The method may include discarding a write-back of the one or more single-use vector register values to a vector register file based on the one or more single-use vector register values being forwarded via a register file cache.

Some embodiments include a system, comprising one or more microprocessors configured to execute one or more instructions of a graphics processing unit (GPU) in a default mode. In some embodiments, the one or more microprocessors are configured to detect a beginning of a single-use section that includes one or more instructions that produce one or more single-use vector register values. In some embodiments, the one or more microprocessors are configured to execute one or more instructions of the GPU in a single-use mode associated with the single-use section.

The system may further include a register file cache and a vector register file. In some embodiments, the one or more microprocessors are configured to evict an entry marked as single-use from the register file cache without writing the entry marked as single-use to the vector register file based on the one or more single-use vector register values in the entry being forwarded at least one of i) directly via a bypass path or ii) via a register file cache.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth©, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this present disclosure as defined in the claims.

What is claimed is:

1. A method of performing opportunistic write-back discard of single-use vector register values, the method comprising:
   executing one or more instructions of a graphics processing unit (GPU) in a default mode;
   detecting a beginning of a single-use section that includes one or more instructions of the GPU that produce one or more single-use vector register values, wherein detecting the beginning of the single-use section includes executing a first hint instruction;
   encoding multiple single-use sections into the first hint instruction;
   detecting an ending of the single-use section, wherein detecting the ending of the single-use section includes executing a second hint instruction; and
   executing the one or more instructions of the GPU in a single-use mode associated with the single-use section, wherein executing the one or more instructions of the GPU in the single-use mode associated with the single-use section further comprises:
      determining whether an output value of the one or more instructions is forwarded to a future instruction via a register file cache;
      based on determining that the output value of the one or more instructions is forwarded to the future instruction, writing the output value to the register file cache;
      based on determining that the output value of the one or more instructions is not forwarded to any future instruction, writing back the output value to a vector register file; and
      evicting one or more entries marked as single-use in the register file cache before other entries to improve hit rate of the register file cache.

2. The method of claim 1, wherein executing the one or more instructions of the GPU in the single-use mode associated with the single-use section further comprises:
   discarding a write-back of the one or more single-use vector register values associated with the one or more instructions of the single-use section to the vector register file based on the one or more single-use vector register values being forwarded via a bypass path.

3. The method of claim 1, wherein executing the one or more instructions of the GPU in the single-use mode associated with the single-use section further comprises:
   discarding a write-back of the one or more single-use vector register values associated with the one or more instructions of the single-use section to the vector register file based on the one or more single-use vector register values being forwarded via the register file cache.

4. The method of claim 1, wherein executing the one or more instructions of the GPU in the single-use mode associated with the single-use section further comprises:
   determining whether an output value of the one or more instructions is forwarded to the future instruction via a bypass path; and
   based on determining that the output value of the one or more instructions is forwarded to the future instruction, sending the output value of the one or more instructions to the future instruction via the bypass path.

5. The method of claim 4, wherein executing the one or more instructions of the GPU in the single-use mode associated with the single-use section further comprises:
   skipping, by the GPU, a write-back of the output value to the vector register file.

6. The method of claim 4, wherein executing the one or more instructions of the GPU in the single-use mode associated with the single-use section further comprises:
   based on determining that the output value of the one or more instructions is not forwarded to the future instruction via the bypass path, determining whether the output value of the one or more instructions is forwarded via the register file cache.

7. The method of claim 1, wherein executing the one or more instructions of the GPU in the single-use mode associated with the single-use section further comprises:
   marking an entry occupied by the output value inside the register file cache as single-use.

8. The method of claim 1 wherein executing the one or more instructions of the GPU in the single-use mode associated with the single-use section further comprises:
   skipping write-back of the output value to the vector register file.

9. A method of preparing an executable program code for performing opportunistic write-back discard of single-use vector register values, the method comprising:
   inserting one or more hint instructions into an executable program code of a graphics processing unit (GPU) that demarcate one or more single-use sections;
   executing one or more instructions of the GPU in a default mode;
   executing the one or more hint instructions;

detecting a beginning of the one or more single-use sections that include the one or more instructions of the GPU that produce one or more single-use vector register values, wherein detecting the beginning of the single-use section includes executing a first hint instruction;

encoding multiple single-use sections into the first hint instruction;

executing the one or more instructions of the GPU in a single-use mode associated with the one or more single-use sections;

detecting an ending of the one or more single-use sections, wherein detecting the ending of the single-use section includes executing a second hint instruction; and based on detecting the ending of the one or more single-use sections, reverting to the default mode, wherein executing the one or more instructions of the GPU in the single-use mode associated with the one or more single-use sections further comprises:

determining whether an output value of the one or more instructions is forwarded to a future instruction via a register file cache;

based on determining that the output value of the one or more instructions is forwarded to the future instruction, writing the output value to the register file cache;

based on determining that the output value of the one or more instructions is not forwarded to any future instruction, writing back the output value to a vector register file; and evicting one or more entries marked as single-use in the register file cache before other entries to improve hit rate of the register file cache.

10. The method of claim 9, wherein executing the one or more instructions of the GPU in the single-use mode associated with the one or more single-use sections further comprises:

discarding a write-back of the one or more single-use vector register values to the vector register file based on the one or more single-use vector register values being forwarded via a bypass path.

11. The method of claim 9, wherein executing the one or more instructions of the GPU in the single-use mode associated with the one or more single-use sections further comprises:

discarding a write-back of the one or more single-use vector register values to the vector register file based on the one or more single-use vector register values being forwarded via the register file cache.

12. A system, comprising:

one or more microprocessors configured to execute one or more instructions of a graphics processing unit (GPU) in a default mode;

a register file cache; and a vector register file, wherein the one or more microprocessors are configured to detect a beginning of a single-use section by executing a first hint instruction, wherein the single-use section includes one or more instructions that produce one or more single-use vector register values;

wherein the one or more microprocessors are configured to encode multiple single-use sections into the first hint instruction;

wherein the one or more microprocessors are configured to detect an ending of the single-use section by executing a second hint instruction;

wherein the one or more microprocessors are configured to execute one or more instructions of the GPU in a single-use mode associated with the single-use section; and wherein the one or more microprocessors are configured to evict an entry marked as single-use from the register file cache without writing the entry marked as single-use to the vector register file based on the one or more single-use vector register values in the entry being forwarded at least one of i) directly via a bypass path or ii) via the register file cache.

* * * * *